(12) United States Patent
Ueda

(10) Patent No.: US 7,764,610 B2
(45) Date of Patent: Jul. 27, 2010

(54) BASE STATION CONTROL APPARATUS AND DOMAIN ACCESS REGULATING METHOD

(75) Inventor: Yoshio Ueda, Tokyo (JP)

(73) Assignee: NEC Corporation, Tokyo (JP)

( * ) Notice: Subject to any disclaimer, the term of this patent is extended or adjusted under 35 U.S.C. 154(b) by 51 days.

(21) Appl. No.: 12/294,273

(22) PCT Filed: Dec. 14, 2006

(86) PCT No.: PCT/JP2006/324900

§ 371 (c)(1),
(2), (4) Date: Sep. 24, 2008

(87) PCT Pub. No.: WO2007/111009

PCT Pub. Date: Apr. 10, 2007

(65) Prior Publication Data

US 2009/0116385 A1 May 7, 2009

(30) Foreign Application Priority Data

Mar. 28, 2006 (JP) ............................. 2006-088493

(51) Int. Cl.
*H04W 72/00* (2009.01)

(52) U.S. Cl. .................. 370/230; 370/235; 370/237; 370/329; 370/439; 455/450; 455/453

(58) Field of Classification Search .............. 370/230, 370/229, 235, 237, 329, 437; 455/453, 450
See application file for complete search history.

(56) References Cited

U.S. PATENT DOCUMENTS

| 6,519,461 B1 * | 2/2003 | Andersson et al. .......... 455/453 |
| 2005/0262266 A1 * | 11/2005 | Wiberg et al. ............... 709/238 |
| 2008/0268864 A1 * | 10/2008 | Andersson et al. .......... 455/453 |

FOREIGN PATENT DOCUMENTS

| JP | 197009340 A | 1/1997 |
| JP | 2000261859 A | 9/2000 |
| JP | 2001078260 A | 3/2001 |

(Continued)

OTHER PUBLICATIONS

3GPP TS 25.401 V7.0.0, "3rd Generation Partnership Project; Technical Specification Group Radio Access Network; UTRAN Overall Description (Release 7)", Mar. 2006, pp. 1-48.

(Continued)

*Primary Examiner*—Ricky Ngo
*Assistant Examiner*—Luat Phung

(57) ABSTRACT

Upon deciding to start domain access regulation, regulation controller (12) reads out a regulation pattern in accordance with a regulation level which represents a percentage of mobile terminals (24) on which regulation of domain access is to be imposed. Informative information transmission controller (14) instructs a base station (23) to transmit, to mobile terminals (24), informative information in which the regulation pattern read by regulation controller (12) is set. Call controller (11) performs processing to release a signaling connection to the CS domain and processing to switch from an individual channel to a common channel with respect to each of mobile terminals (24), whose percentage is in accordance with the regulation level, and that have transmitted a message for establishing a signaling connection to the CS domain.

4 Claims, 4 Drawing Sheets

FOREIGN PATENT DOCUMENTS

| | | | |
|---|---|---|---|
| JP | 2003513533 | A | 4/2003 |
| JP | 2003189344 | A | 7/2003 |
| JP | 2003199174 | A | 7/2003 |
| JP | 2003244284 | A | 8/2003 |
| JP | 2004040460 | A | 2/2004 |
| JP | 2005348392 | A | 12/2005 |
| JP | 2006080693 | A | 3/2006 |

OTHER PUBLICATIONS

International Search Report for PCT/JP2006/324900 mailed Mar. 13, 2007.

* cited by examiner

Figure 2

| access class | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| pattern 1 | × | O | O | × | O | O | × | O | O | O | O | O | O | O | O | O |
| pattern 2 | O | × | O | O | × | O | O | × | O | O | O | O | O | O | O | O |
| pattern 3 | O | O | × | O | O | × | O | O | × | O | O | O | O | O | O | O |
| pattern 4 | O | O | O | × | O | O | × | O | O | × | O | O | O | O | O | O |
| pattern 5 | × | O | O | O | × | O | O | × | O | O | O | O | O | O | O | O |
| pattern 6 | O | × | O | O | O | O | O | × | O | O | O | O | O | O | O | O |
| pattern 7 | O | O | × | O | O | O | × | O | O | × | O | O | O | O | O | O |
| pattern 8 | × | O | O | × | O | O | O | O | × | O | O | O | O | O | O | O |
| pattern 9 | O | × | O | O | × | O | O | O | O | × | O | O | O | O | O | O |
| pattern 10 | O | O | × | O | O | × | O | O | O | × | O | O | O | O | O | O | example of access class regulation patterns (for regulation level of 30%)
(O indicates no regulation and × indicates being subject to regulation)

BASE STATION CONTROL APPARATUS AND DOMAIN ACCESS REGULATING METHOD

TECHNICAL FIELD

The present invention relates to a base station control apparatus and a domain access regulating method for regulating domain access by a mobile terminal to a CS (Circuit Switched) domain.

BACKGROUND ART

As described in 3GPP TS25.401, in a CN (Core Network) domain, there are CS domain, PS (Packet Switched) domain, and BC (Broadcast) domain.

The 3GPP TS25.331 sets forth a technique for regulating domain access to the CS and PS domains, which are CN domains. The CS domain refers to a CN domain which handles circuit-switched services for such data as audio and UDI (Unrestricted Digital Information). The PS domain refers to a CN domain that mainly handles packet-switched services.

In a conventional practice, when a base station control apparatus (RNC Radio Network Controller) regulates access to the CN domain by a mobile terminal, it informs the mobile terminal of System Information Block Type 3 of RRC (Radio Resource Control) protocol (see Patent Documents 1 and 2, for instance).

In such a case, since a mobile terminal when idle or a mobile terminal that uses a common channel (Cell_FACH, Cell_PCH, and URA_PCH) can read in the System Information Block Type 3 informed by the base station control apparatus, the mobile terminal autonomously regulates its access to the CN domain based on the System Information Block Type 3.

More specifically, a mobile terminal in an idle state or a mobile terminal using a common channel saves access class regulation patterns that are set in the System Information Block Type 3, and autonomously regulates its access to the CN domain when it determines that the mobile terminal is now covered by domain access regulation based on an access class regulation pattern.

However, a mobile terminal that is performing packet communication using an individual channel (Cell_DCH) cannot read in the System Information Block Type 3. For this reason, a related base station control apparatus cannot impose regulation of domain access to the CN domain on a mobile terminal that is currently conducting packet communication over an individual channel.

By way of example, consider a case where access to the CS domain for the purpose of voice calling are regulated and access to the PS domain for packet communication are allowed to continue when the CN is in congestion due to signaling, e.g., for voice calling.

In such a situation, since a mobile terminal that is performing packet communication using an individual channel cannot be covered by regulation of domain access to the CS domain as described above, such a mobile terminal transmits an INITIAL DIRECT TRANSFER message, which is a message for establishing a signaling connection, in order to establish a signaling connection to the CS domain.

In response, the base station control apparatus blocks the INITIAL DIRECT TRANSFER message and sends a SIGNALING CONNECTION RELEASE message back to the mobile terminal. In such a manner, the base station control apparatus releases a signaling connection to the CS domain and prevents establishment of a signaling connection.

However, the base station control apparatus cannot prevent a mobile terminal from voice re-calling such as by redialing. Accordingly, repeated voice calls may bring the base station control apparatus and/or an exchange into an overloaded state.

Patent Document 1: Japanese Patent Laid-Open No. 09-009340

Patent Document 2: Japanese Patent Laid-Open No. 2003-244284

In view of such circumstances, it is an object of the present invention to provide a base station control apparatus and a domain access regulation method that can impose regulation of domain access to the CS domain even on a mobile terminal that is performing packet communication using an individual channel.

DISCLOSURE OF THE INVENTION

To attain the above object, a base station control apparatus according to a first aspect of the present invention is a base station control apparatus for regulating domain access to a CS domain by a mobile terminal performing communication via a base station, the base station control apparatus including:

a database for retaining regulation patterns showing mobile terminals that are to be covered by domain access regulation;

a congestion detector for detecting congestion in a core network;

a regulation controller for, if congestion is detected by the congestion detector, deciding to start domain access regulation control, determining a regulation level which represents a percentage of mobile terminals on which regulation of domain access is to be imposed, and reading out from the database one of the regulations pattern in accordance with the determined regulation level;

an informative information transmission controller for, if the start of domain access regulation control is decided by the regulation controller, setting the regulation pattern read out by the regulation controller in informative information and instructing the base station to transmit to the mobile terminal the informative information in which the regulation pattern has been set; and a call controller for, if the start of domain access regulation control is decided by the regulation controller, performing processing to release a signaling connection with the CS domain and processing to switch from an individual channel to a common channel with respect to each of mobile terminals, whose percentage is in accordance with the regulation level, and that have transmitted a message for establishing a signaling connection to the CS domain during packet communication using an individual channel.

Also, to attain the above object, a base station control apparatus according to a second aspect of the present invention is a base station control apparatus for regulating domain access to a CS domain by a mobile terminal performing communication via a base station, the base station control apparatus including:

a database for retaining regulation patterns showing mobile terminals that are to be covered by domain access regulation;

an input unit to which a regulation level representing a percentage of mobile terminals on which regulation of domain access is to be imposed is input along with an instruction to start domain access regulation;

a regulation controller for, if an instruction to start domain access regulation is input to the input unit, deciding to start domain access regulation control and reading out from the database one of the regulation patterns in accordance with the regulation level input to the input unit;

an informative information transmission controller for, if initiation of domain access regulation control is decided by the regulation controller, setting the regulation pattern read out by the regulation controller in informative information and instructing the base station to transmit to the mobile terminal the informative information in which the regulation pattern has been set; and a call controller for, if the start of domain access regulation control is decided by the regulation controller, performing processing to release a signaling connection with the CS domain and processing to switch from an individual channel to a common channel with respect to each of mobile terminals, whose percentage is in accordance with the regulation level, and that have transmitted a message for establishing a signaling connection to the CS domain during packet communication using an individual channel.

As described above, according to the present invention, when the start of domain access regulation control is decided, the informative information transmission controller sets a regulation pattern corresponding to a regulation level read out by the regulation controller in informative information, and instructs the base station to transmit the informative information to the mobile terminal. The call controller performs processing to release a signaling connection with the CS domain and processing to switch from an individual channel to a common channel with respect to each of mobile terminals, whose percentage is in accordance with the regulation level, and that have transmitted a message for establishing a signaling connection to the CS domain during packet communication using an individual channel.

This can force a regulation-level percentage of those mobile terminals that have transmitted a message for establishing a signaling connection with the CS domain during packet communication using an individual channel to transfer from the individual channel to a common channel. Since a mobile terminal that has thus transferred to a common channel can read in informative information, the mobile terminal autonomously regulates its access to the CS domain if the mobile terminal determines that it is covered by domain access regulation based on a regulation pattern set in the informative information.

It is therefore possible to prevent those mobile terminals that have transferred to common channels and that are covered by domain access regulation from voice re-calling such as by redialing and transmitting a message for establishing a signaling connection, which can hence reduce the possibility of the base station control apparatus and the exchange becoming overloaded.

BRIEF DESCRIPTION OF THE DRAWINGS

FIG. 2 shows an example of access class regulation patterns which are saved in the station database shown in FIG. 1;

BEST MODE FOR CARRYING OUT THE INVENTION

A best mode for carrying out the present invention will be described below with reference to drawings.

Figure 1:
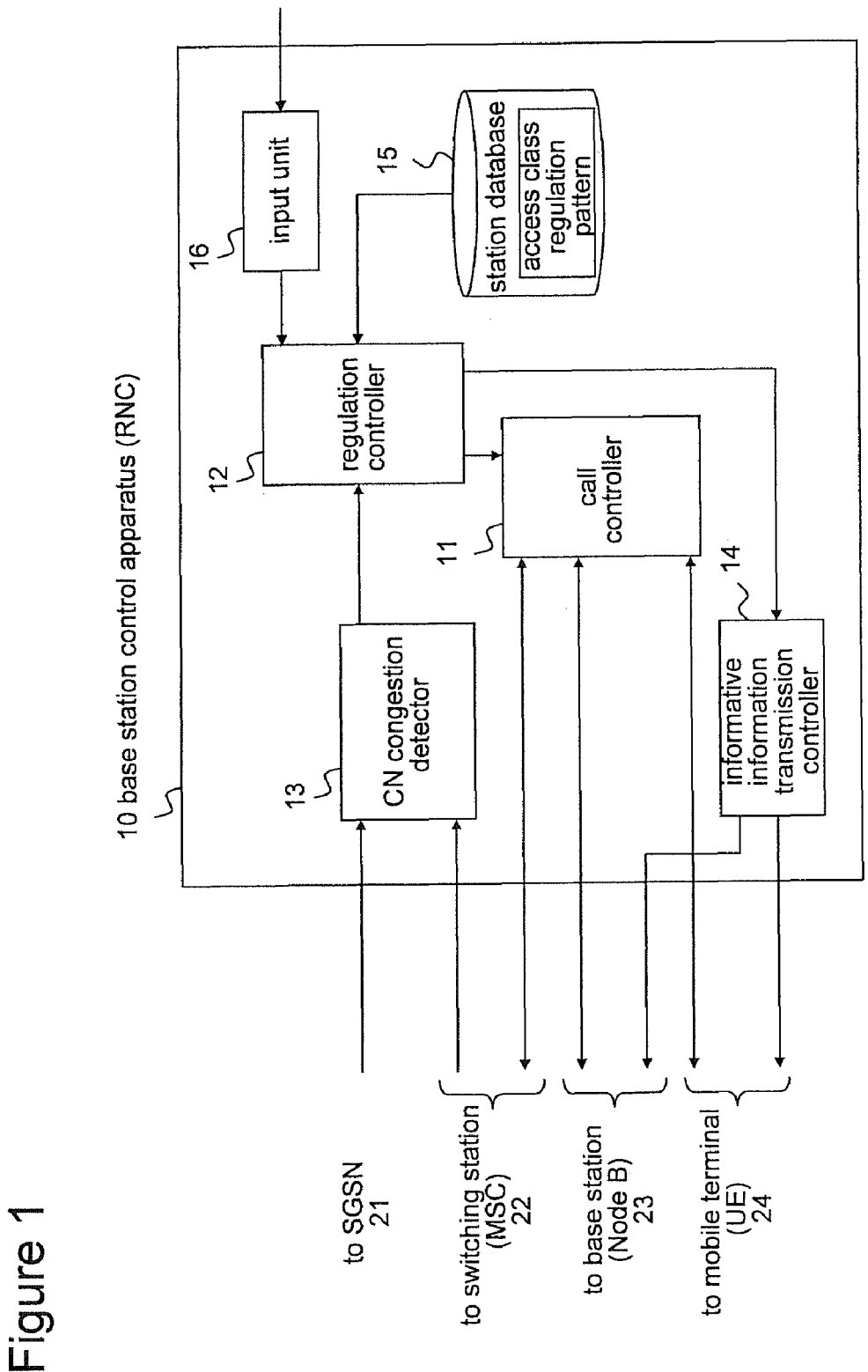
FIG. 1 shows a configuration of a base station control apparatus according to an exemplary embodiment of the present invention.

FIG. 1 shows a configuration of a base station control apparatus (RNC) 10 according to an exemplary embodiment of the present invention.

Referring to FIG. 1, base station control apparatus 10 of this exemplary embodiment includes call controller 11, regulation controller 12, CN congestion detector 13, informative information transmission controller 14, station database 15, and input unit 16.

CN congestion detector 13 detects congestion in the CN domain. CN congestion detector 13 is realized by using a known technique rather than a special technique and it detects that the CN domain is congested when an event (A) or (B) below has occurred, for example:

(A) Detect that a transmission channel failure has occurred in Iu interface and that a No. 7 link has been disconnected.

(B) Receive an OVERLOAD message of RANAP (Radio Access Network Application) protocol, which is defined in 3GPP TS25.413, from SGSN (Serving GPRS Support Node) 21 or from switching station (MSC: Mobile Switching Center) 22.

If CN congestion detector 13 detects congestion in the CN domain, CN congestion detector 13 informs regulation controller 12 of the congestion. CN congestion detector 13 also informs regulation controller 12 upon detecting that congestion in the CN domain has been alleviated.

Having being informed of congestion in the CN domain by CN congestion detector 13, regulation controller 12 decides to start regulation control of domain access to the CS domain that is made for voice calling.

Regulation controller 12 then determines a regulation level R(%) which represents the percentage of mobile terminals (UEs) 24 which are to be subjected to regulation of domain access to the CS domain, and selects and reads out an access class regulation pattern that corresponds to the determined regulation level (%) from station database 15.

For example, when CN congestion detector 13 has detected CN congestion as in (A) above due to occurrence of a transmission channel failure in the Iu interface between switching station 22 and base station control apparatus 10, regulation controller 12 sets the regulation level R to 100(%). In this case, if the regulation level R (%) is put back to 0(%) immediately after the CN congestion becomes alleviated, there would be a rush of position data registration from mobile terminals 24, which can cause the network to become overloaded. Therefore, regulation controller 12 reduces the regulation level R mildly and gradually from 100(%) in steps of 20(%), for example, when the CN congestion has been alleviated.

Also when CN congestion detector 13 has detected congestion in the CN domain due to a transmission channel failure in the Iu interface between SGSN 21 and base station control apparatus 10, regulation controller 12 similarly sets the regulation level R to 100(%) as described above. Likewise, when the CN congestion has been alleviated, regulation controller 12 also reduces the regulation level R from 100(%) mildly and gradually as described above.

If CN congestion detector 13 has detected congestion in CN by receiving an OVERLOAD message as in (B) above, the OVERLOAD message contains the level of CN congestion in 16 levels, which is called Number of Steps. In this case, accordingly, regulation controller 12 decides the regulation level R(%) in accordance with the level of the CN congestion.

When the start or stop of domain access regulation is manually directed by an operator via input unit 16, regulation controller 12 decides to start or stop regulation control of domain access to the CS domain for voice calling. In this case, the regulation level R(%) is specified by the operator by way of input unit 16.

Station database 15 retains access class regulation patterns that show which mobile terminals 24 are to be covered by regulation of domain access to the CS domain in correspondence with the regulation level R(%).

FIG. 2 shows an example of access class regulation patterns for the regulation level R of 30(%). Such access class regulation patterns are prescribed in 3GPP TS22.011.

Referring to FIG. 2, normal mobile terminal 24 is randomly assigned any one of access classes 0 to 9. Access class 10 is assigned for emergency calls and access classes 11 through 15 are assigned to special-purpose mobile terminals. For example, access class regulation pattern 1 shows that mobile terminals 24 which are assigned access classes 0, 3, and 6 are covered by regulation of domain access to the CS domain.

Regulation controller 12 also instructs informative information transmission controller 14 to start control of informative information transmission and instructs call controller 11 to start domain access regulation control.

Upon being thus instructed by regulation controller 12, informative information transmission controller 14 sets parameters in System Information Block Type 3 (e.g., sets the access class regulation pattern read out from station database 15 by regulation controller 12), and also schedules informative information. Informative information transmission controller 14 also instructs base station (Node B) 23 to transmit informative information with the parameters set as described above and informs mobile terminal 24 of the timing for receiving the informative information with the parameters set as described above.

Call controller 11 is responsible for overall control for realizing call processing. In the present invention, call controller 11 starts domain access regulation control upon being instructed by regulation controller 12 as described above. Specifically, call controller 11 performs processing to release a signaling connection with the CS domain and processing to switch from an individual channel to a common channel with respect to mobile terminals 24 that are performing packet communication using individual channels.

Hereinafter, the way to regulate domain access by base station control apparatus 10 shown in FIG. 1 will be described. In this exemplary embodiment, two ways for regulation domain access are possible: (1) manual regulation which involves an operator manually starting and stopping domain access regulation; and (2) automatic regulation which involves automatic start and stop of domain access regulation upon detection of congestion in the CN domain. The following description illustrates regulating domain access according to the automatic regulation described under (2).

Figure 3:
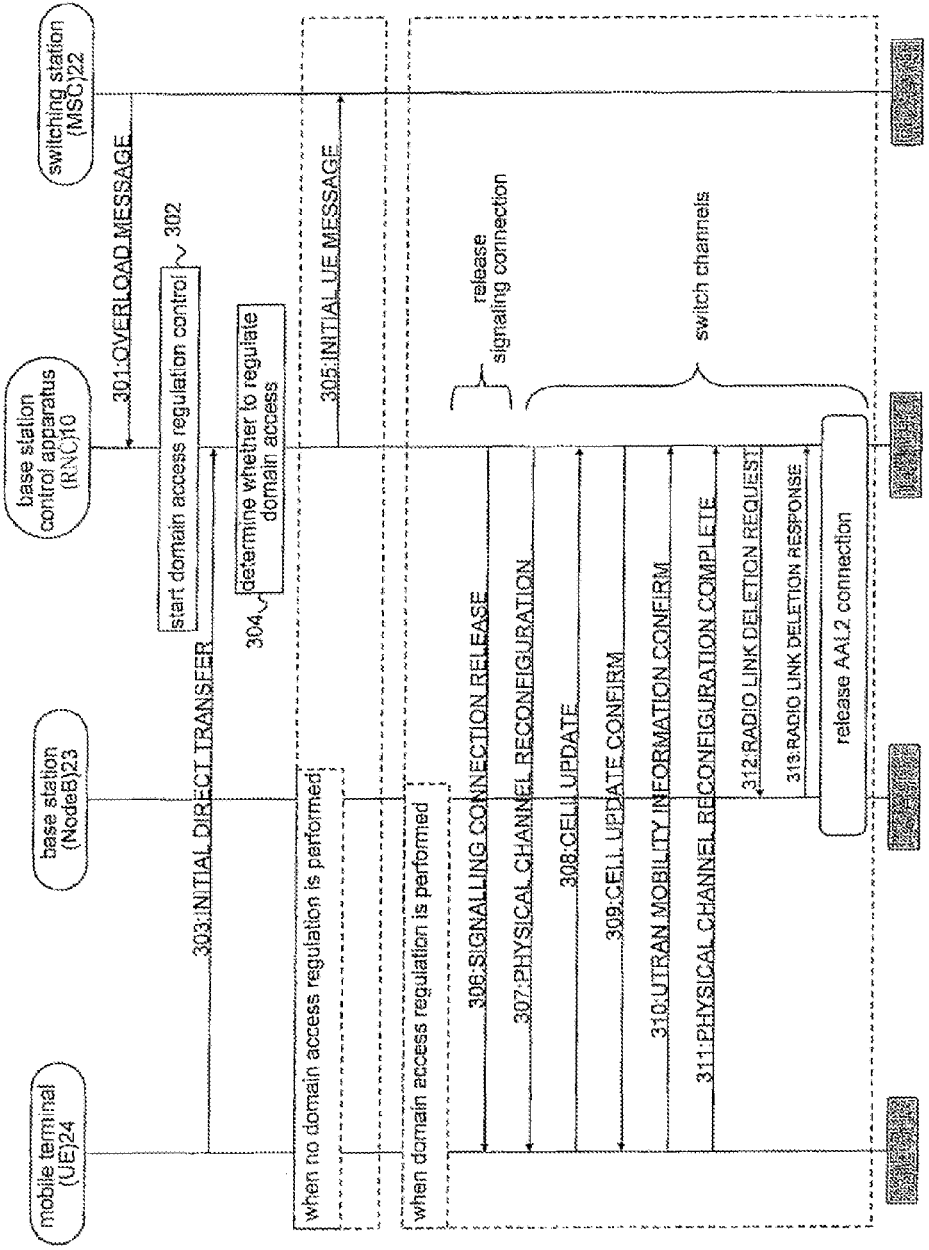
FIG. 3 is a flowchart illustrating an example of a domain access regulation method for the base station control apparatus shown in FIG. 1.

FIG. 3 shows a flowchart for illustrating domain access regulation based on automatic regulation at base station control apparatus 10 shown in FIG. 1.

Referring to FIG. 3, when CN congestion detector 13 detects that the CN domain is congested upon receiving an OVERLOAD message from switching station 22, CN congestion detector 13 informs regulation controller 12 of the congestion at step 301. CN congestion detector 13 can also detect CN congestion by detecting disconnection of the No. 7 link as in (A) described above. CN congestion detector 13 may also detect CN congestion by receiving an overload message from SGSN 21 as in (B) described above.

Then, at step 302, regulation controller 12 decides to start regulation control of domain access to the CS domain for voice calling.

Regulation controller 12 then decides the regulation level R(%) representing the percentage of mobile terminals 24 which will be covered by domain access regulation, and selects and reads an access class regulation pattern corresponding to the regulation level R(%) decided from station database 15.

Regulation controller 12 also instructs informative information transmission controller 14 to start control of informative information transmission. In response, informative information transmission controller 14 sets parameters in System Information Block Type 3 (e.g., sets the access class regulation pattern read out from station database 15 by regulation controller 12) and schedules informative information. Informative information transmission controller 14 also instructs base station 23 to transmit informative information whose parameters have been thus set to mobile terminal 24 and informs mobile terminal 24 of the timing for receiving the informative information with the parameters thus set.

Furthermore, regulation controller 12 instructs call controller 11 to start domain access regulation control. In response, call controller 11 starts control for regulating domain access.

Assume here that at step 303 mobile terminal 24 transmits an INITIAL DIRECT TRANSFER message, which is a message for establishing a signaling connection to the CS domain, using an individual channel.

Figure 4:
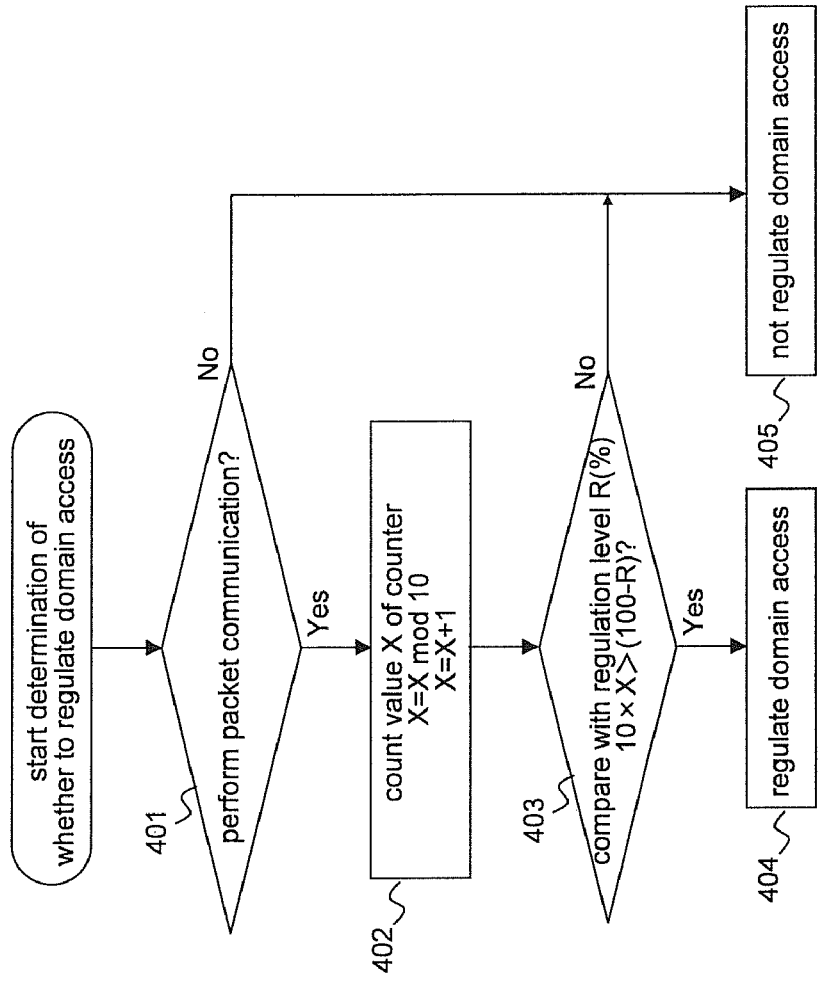
FIG. 4 is a flowchart illustrating an example of access regulation determination shown in FIG. 3.

Then, call controller 11 determines at step 304 whether to perform domain access regulation for mobile terminal 24 that has transmitted the INITIAL DIRECT TRANSFER message as shown in FIG. 4, for instance.

Referring to FIG. 4, if mobile terminal 24 is performing packet communication at step 401, call controller 11 first, at step 402, executes mod calculation for putting the present count value X of a counter to 0 if the value is 10 and further increments the result of the mod calculation by one so as to make it the new count value X. Next, at step 403, call controller 11 compares the result of multiplying the new X obtained at step 402 by 10 with the result of subtracting the regulation level R(%) decided by regulation controller 12 from 100. If the resulting value of the multiplication is greater than the resulting value of the subtraction at step 403, call controller 11 decides to perform domain access regulation at step 404. On the other hand, if mobile terminal 24 does not perform packet communication at step 401 or if the resulting value of the multiplication is equal to or smaller than the resulting value of the subtraction at step 403, call controller 11 decides not to perform domain access regulation at step 405.

Referring to FIG. 3 again, if call controller 11 decides not to perform domain access regulation as a result of the determination of domain access regulation at step 304, call controller 11 transmits an INITIAL UE MESSAGE to switching station 22 at step 305. As a result, a signaling connection with the CS domain from mobile terminal 24 to switching station 22 is established.

On the other hand, if call controller 11 decides to perform domain access regulation in the determination of domain access regulation at step 304, call controller 11 performs processing to release the signaling connection with the CS domain from mobile terminal 24 and processing to switch from the individual channel being used by mobile terminal 24 to a common channel.

Here, to release the signaling connection, call controller 11 performs processing as described below with mobile terminal 24 in accordance with a procedure defined in 3GPP TS25.331 8.1.13.

Call controller 11 transmits a SIGNALING CONNECTION RELEASE message, which specifies a CS domain for which the signaling connection is to be released, to mobile terminal 24 according to the RRC protocol at step 306. This releases the signaling connection to the CS domain from mobile terminal 24.

Also, for channel switching, call controller 11 first performs processing as described below with mobile terminal 24 in accordance with a procedure defined in 3GPPTS25.331 8.1.13.

First, at step 307, call controller 11 transmits a PHYSICAL CHANNEL RECONFIGURATION message to mobile terminal 24 in order to transfer mobile terminal 24 to a common channel (Cell_FACH). In response to the message, at step 308, mobile terminal 24 transfers to a common channel in accordance with parameters set in the PHYSICAL CHANNEL RECONFIGURATION message, reselects a cell for the common channel to which it has transferred, and transmits a CELL UPDATE message to base station control apparatus 10.

Next, call controller 11 transmits a CELL UPDATE CONFIRM message to mobile terminal 24 at step 309. In response, mobile terminal 24 transmits as response messages an UTRAN MOBILITY INFORMATION CONFIRM message and a PHYSICAL CHANNEL RECONFIGURATION COMPLETE message to base station control apparatus 10 at steps 310 and 311.

Call controller 11 also subsequently performs processing described below with base station 23 for channel switching in accordance with a procedure defined in 3GPP TS25.433.

Call controller 11 transmits a RADIO LINK DELETION REQUEST message to base station 23 at step 312 in order to release an AAL2 (ATM Adaptation Layer 2) connection with base station 23. In response, base station 23 releases the AAL2 connection on an individual channel and transmits a RADIO LINK DELETION RESPONSE message to base station control apparatus 10. As a result, the individual channel for mobile terminal 24 is transferred to a common channel.

Since mobile terminal 24 can now read in the System Information Block Type 3 for the RRC protocol after transferring to the common channel, mobile terminal 24 saves the access class regulation pattern which is set in the System Information Block Type 3.

When a user subsequently performs voice re-calling such as by redialing, mobile terminal 24 autonomously regulates transmission of INITIAL DIRECT TRANSFER message, which is a message for establishing a signaling connection to the CS domain, if mobile terminal 24 determines that an access class assigned to itself is covered by domain access regulation based on the access class regulation pattern saved as described above.

As has been described, in this exemplary embodiment, mobile terminals 24 whose percentage is in accordance with the regulation level R(%) and that are performing packet communication using individual channels are made transfer to common channels. After transferring to a common channel, mobile terminal 24 autonomously regulates its domain access to the CS domain if that mobile terminal 24 is covered by domain access regulation.

This thus can prevent those mobile terminals 24 of R (%) that have transferred to common channel state and that are covered by domain access regulation from again transmitting an INITIAL DIRECT TRANSFER message, which is a message for establishing a signaling connection. It therefore is possible to reduce the possibility of base station control apparatus 10 and switching station 22 becoming overloaded.

Although this exemplary embodiment illustrates a case where domain access regulation is started based on automatic regulation, an operator may initiate of domain access regulation via input unit 16 on his own at the time of an emergency and the like so as to regulate access for voice calling and not to regulate access for packet communication, e.g., for a disaster bulletin board.

In addition, while this exemplary embodiment describes an example of regulation of audio as circuit-switched calls during packet communication, the present invention is also applicable to such circuit-switched calls as videophone services, unrestricted digital services (UDI services), and facsimile.

The invention claimed is:

1. A base station control apparatus for regulating domain access to a CS domain by a mobile terminal performing communication via a base station, the base station control apparatus comprising:
    a database for retaining regulation patterns showing mobile terminals that are to be covered by domain access regulation;
    a congestion detector for detecting congestion in a core network;
    a regulation controller for, if congestion is detected by the congestion detector, deciding to start domain access regulation control, determining a regulation level which represents a percentage of mobile terminals on which regulation of domain access is to be imposed, and reading out from the database one of the regulation patterns in accordance with the determined regulation level;
    an informative information transmission controller for, if start of domain access regulation control is decided by the regulation controller, setting the regulation pattern read out by the regulation controller in informative information and instructing the base station to transmit to the mobile terminal the informative information in which the regulation pattern has been set; and
    a call controller for, if start of domain access regulation control is decided by the regulation controller, performing processing to release a signaling connection with the CS domain and processing to switch from an individual channel to a common channel with respect to each of mobile terminals, whose percentage is in accordance with the regulation level, and that have transmitted a message for establishing a signaling connection to the CS domain during packet communication using an individual channel.

2. A base station control apparatus for regulating domain access to a CS domain by a mobile terminal performing communication via a base station, the base station control apparatus comprising:
    a database for retaining regulation patterns showing mobile terminals that are to be covered by domain access regulation;
    an input unit to which a regulation level representing a percentage of mobile terminals on which regulation of domain access is to be imposed is input along with an instruction to start domain access regulation;
    a regulation controller for, if an instruction to start domain access regulation is input to the input unit, deciding to start domain access regulation control and reading out from the database one of the regulation patterns in accordance with the regulation level input to the input unit;
    an informative information transmission controller for, if start of domain access regulation control is decided by the regulation controller, setting the regulation pattern read out by the regulation controller in informative information and instructing the base station to transmit to the mobile terminal the informative information in which the regulation pattern has been set; and a call controller for, if start of domain access regulation control is decided by the regulation controller, performing processing to release a signaling connection with the CS domain and processing to switch from an individual channel to a common channel with respect to each of mobile terminals, whose percentage is in accordance with the regulation level, and that have transmitted a message for establishing a signaling connection to the CS domain during packet communication using an individual channel.

3. A domain access regulating method for a base station control apparatus to regulate domain access to a CS domain by a mobile terminal performing communication via a base station, the method comprising:

retaining regulation patterns showing mobile terminals that are to be covered by domain access regulation in a database;

detecting congestion in a core network;

if congestion in the core network is detected, deciding to start domain access regulation control, determining a regulation level which represents a percentage of mobile terminals on which regulation of domain access is to be imposed, and reading out from the database one of the regulation patterns in accordance with the regulation level determined;

if start of domain access regulation control is decided, setting the regulation pattern read out from the database in informative information, and instructing the base station to transmit to the mobile terminal the informative information in which the regulation pattern has been set; and if start of domain access regulation control is decided, performing processing to release a signaling connection with the CS domain and processing to switch from an individual channel to a common channel with respect to each of mobile terminals, whose percentage is in accordance with the regulation level, and that have transmitted a message for establishing a signaling connection to the CS domain during packet communication using an individual channel.

4. A domain access regulating method for a base station control apparatus to regulate domain access to a CS domain by a mobile terminal performing communication via a base station, the method comprising:

retaining regulation patterns showing mobile terminals that are to be covered by domain access regulation in a database;

if a regulation level representing a percentage of mobile terminals on which regulation of domain access is to be imposed is input along with an instruction to start domain access regulation, deciding to start domain access regulation control and reading out from the database one of the regulation patterns in accordance with the regulation level;

if start of domain access regulation control is decided, setting the regulation pattern read out from the database in informative information and instructing the base station to transmit to the mobile terminal the informative information in which the regulation pattern has been set; and if start of domain access regulation control is decided, performing processing to release a signaling connection with the CS domain and processing to switch from an individual channel to a common channel with respect to each of mobile terminals, whose percentage is in accordance with the regulation level, and that have transmitted a message for establishing a signaling connection to the CS domain during packet communication using an individual channel.

* * * * *